July 24, 1928.
G. GRIFFITH
1,678,062
RANGE FINDER
Filed Oct. 11, 1926
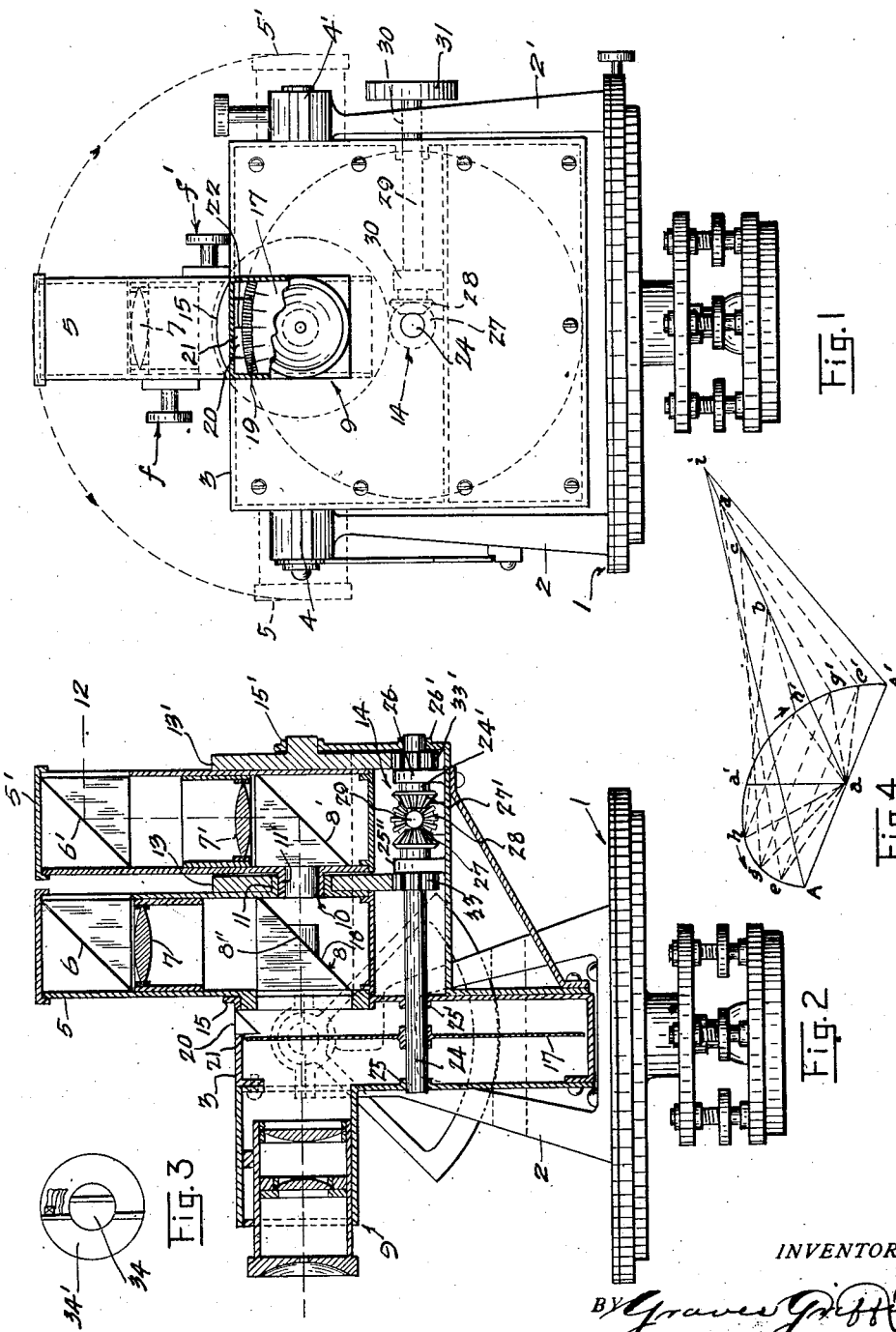
INVENTOR
By Graves Griffith
ATTORNEY Patented July 24, 1928.

1,678,062

UNITED STATES PATENT OFFICE.

GRAVES GRIFFITH, OF SAN FRANCISCO, CALIFORNIA.

RANGE FINDER.

Application filed October 11, 1926. Serial No. 140,863.

The present invention relates to improvements in range-finders, and more particularly to those of the type ordinarily known as the constant-angle variable-base, or those in which the object-angle remains constant while the base varies with the changing distance. In this type of instrument, as in the opposite wherein the object-angle varies with the changing distance and the base is self-contained and remains constant, the practice is to employ an optical system adapted to the production of two half-images the bringing of which into coincidence constitutes the means through which the distance is determined, the principle involved being dependent upon the trigonometrical solution of right-angled triangles.

The principal object of the present invention is the provision of a simplified form of the variable-base type of instrument in which reliance for image coincidence is based upon movements through arc of a pair of prismatic telescopes, rather than to the movements of either a reflective or a refractive element along the path of a reflected ray as in present practice, and the recordation of these arc-movements as measures of distance by means of the rotation of a circular scale-member co-operatively associated in movement with those of the prismatic telescopes.

Supplementary to the preceding is that of providing a simple and efficient precision instrument for determining distances adaptable for use by surveyors, engineers, and military and naval officers.

Other objects and advantages will appear as this specification progresses and be more fully set forth in the claims hereto appended.

In the accompanying drawings, forming a part of the specification and in which similar characters of reference refer to like parts, throughout:

Figure 1 is a rear view in elevation, with a part broken away, showing the rear telescope in perpendicular position, the two telescopes in horizontal extension, dotted lines, representing the extreme limit of base for a particular instrument, the circular scale member and graduations, the prism for scale member illumination, the scale indicator as borne by the emergent face of this prism, members of the common actuating mechanism controlling the movements of the two telescopes and scale member, the casing bearing the telescopic and scale members, and the mounting adapting the instrument to field use;

Figure 2 is a vertical section, side elevation, showing the two telescopes in perpendicular position and horizontal alignment and rotatively connected, the character and arrangement of the optical systems of the two telescopic members, the scale member and its means of illumination, the common mechanism for the synchronized actuation of both telescopic members and scale member, the ocular, the tripod head, and the manner of mounting the instrument upon the tripod head, where intended for field use;

Figure 3 is a plan view of the image plane, showing the two portions of the field, the one inscribed within the other, and the displaced sections of an image as they would appear before being brought into coincidence; and Figure 4 is a diagrammatic view illustrative of the different planes of operation, the triangulation principle involved for the varying bases, and the circular sweep in opposed directions of the telescopic members required to bring displaced images into coincidence.

Referring to the drawings with greater particularity as to details, 1 indicates in a general way the head, of usual transit construction, bearing the yoke 2 in which the housing 3 is revolubly supported by trunnions 4 and 4', after the manner of that of the telescope of the ordinary transit.

The optical systems consist of two telescopic members 5 and 5' of prismatic character, each comprising an initial ray-receiving reflective element 6, 6', an objective 7, 7' focusable by a means $f$, $f'$, a final reflective ocular element 8, 8', and an ocular 9 common to both said telescopic members.

The telescopic members 5 and 5' are rotatably connected, as indicated at 10, by means of sleeves 11 and 11' borne respectively by these members and adapted to afford a means of intercommunication therebetween and of such arrangement as to permit partial rotation about the incident ray 12 as finally reflected by the element 8' as an axis of rotation, this rotation being effected through the gears 13 and 13' borne respectively by these members and actuated by the mechanism 14, the telescopic members being further rotatively supported in bearings 15 and 15' borne by the housing 3.

The reflective elements constituting the reflective systems of the telescopic members, as indicated, are of like character but opposite disposition, this disposition resulting in the reflective action of the rhomboidal prism, in which, when rotated about a fixed axis, the images are caused to follow arcuate courses while retaining their erect positions.

The rearmost 8 of the ocular reflective elements has a central section 8″ of its hypotenusal reflective prism surface 16 removed, or rendered light transmissive, to permit the light rays reflected centrally by the element 8′ to pass unobstructed therethrough to the image plane.

It may be pertinent in this connection to note that, in the construction of the element 8, the central reflective surface removed, or rendered light transmissive, is preferably of circular form, and that, as applied to prisms, it may be recessed, or it may be provided for exteriorly of the hypothenusal surface and cemented thereto, only observing that its entrant face be in parallelism with the emergent face of the prism element.

The scale member for registering the degree of movement of the telescopic members necessary to bring about image coincidence consists of a transparent circular member 17 borne by the shaft 24 and bearing marginally graduations 19, the scale member occupying a position in the image plane and being adaptable for rotation therewithin, there being also provided for the illumination of its graduations a prism means 20 bearing upon the face 21 a scale indicating means 22.

The operating mechanism 14 comprises the divided shaft 24—24′, carried respectively in bearings 25, 25′ and 25″ and 26 and 26′, and bearing respectively bevel-gear 27 and 27′ meshing with the bevel-gear 28 borne by the shaft 29 carried in bearings 30, the shaft 29 being additionally provided with a knurled knob 31 for its actuation. The shafts 24 and 24′ respectively are further provided with gears 33 and 33′ in mesh with the gears 13 and 13′ carried by the telescopic members 5 and 5′ and serve for the rotation through arc of these members, the proportion between these gears being such that a movement through quadrant for each of the members cause a complete revolution of the scale member 17, carried also by this shaft 24.

The image field, as it would appear for displaced images, is shown in Figure 3, the image being represented by a flag and its staff; the central field 34 bearing the middle portion of the staff displaced to the right, while the circumscribing portion of the field 34′ bears the flag and remaining portions of the staff displaced to the left. As is to be observed, there are here presented double the usual number of contacting points for coincidences, conditions insuring greater certainty and precision in this direction.

The principles of triangulation involved are presented diagrammatically in Figure 4. Here A A′ represents the base line of an instrument; $a'$ $i$ a line bisecting the base line at $a$ and at right angles thereto; $b$, $c$, $d$ and $i$ distance points along the line $a$ $i$, this line constituting the line of direction; $a$ $a'$ the vertical position of the telescopic members 5 and 5′; $a'$ $h$, $h$ $g$ $g$ $e$ and $e$ A, arc movements described by the telescopic member 5 in bringing the points $b$, $c$, $d$ and $i$ into proper coincidence position; $a'$ $h'$, $h'$ $g'$, $g'$ $e'$ and $e'$ A′, arc movements described by the telescopic member 5′, similar to those described by the member 5 and for a like purpose; $h$ $h'$, $g$ $g'$, $e$ $e'$ and A A′, lines paralleling each other and the equivalents, respectively, of the chords of the sums of the preceding arcs taken in couplets of similar equal arcs; A A $i$, $e$ $e'$ $d$, $g$ $g'$ $c$ and $h$ $h'$ $b$, similar isosceles triangles, and $a$ $h$, $a$ $g$, $a$ $e$ and $a$ A, and $a$ $h'$, $a$ $g'$, $a$ $e'$ $a$ A′, the different positions assumed, respectively, by the telescopic members 5 and 5′ in describing these arc movements. It is obvious that, if a plane perpendicular to A A′ were passed along $a$ $i$, it would bisect those triangles producing upon either side of the plane an equal number of similar right angled triangles whose variable bases would be proportionate to their respective other sides, thereby affording the required data for distance measurements.

The scale graduations for an instrument of a particular base limit are arrived at by directing the instrument upon an object at a known or calculated distance, bringing about coincidence of images, and ascertaining the proportion between the variable base thus secured and the known distance, and graduating the scale accordingly. No provisions are made for obtaining the distances to very near objects, as the blanking of the rear by the forward telescopic member prevents—a matter of no particular consequence.

In operation, the instrument with its telescopic members in vertical position is levelled and directed upon the object whose distance is desired and the image as presented through the forward telescopic member brought to the center of the image field. With the instrument clamped in this position, the telescopic members 5 and 5′ are rotated in opposed directions, through the medium of the knurled knob 31, until the images are brought into coincidence, when the reading for distance is taken directly from the scale 17 as indicated by the means 22.

The instrument as here presented is adapted more particularly to field work, and may, in addition to distance finding, be applied to that of the transit or theodolite by simply retaining the telescopic members in the vertical position, as both altitude and azimuth movements are provided for in connection with the usual compass.

Having thus described my invention, I claim, and desire to secure by Letters Patent:

1. A light reflective element of prism form having centrally and exteriorly of its reflective face and cemented thereto a light transmissive cylindrical element fashioned to conform to said face and having its entrant face in parallelism with that of the emergent face of said prism, a reflective prism element in co-operative association with said cylindrical element and having the axis of reflection of its reflective surface in co-axial alignment with the axis of said cylindrical element, and a tubular connecting means revolubly uniting said prism elements and adapted to permit their rotation in opposite directions through quadrant and about said co-axis as the axis of rotation.

2. In an instrument of the character described, the combination with an ocular, of a pair of reflective systems each comprised of an upper and lower oppositely disposed prism element, the upper elements of the two systems constituting the initial ray-receiving and reflecting features and the lower elements of the two systems the ocular reflecting features, the rearward of said lower elements being rendered centrally light transmissive and the forward of said lower elements being adapted to direct light centrally to and through said light transmissive section of said rearward lower element, the two systems being similar, and parallel and means whereby the two systems may be rotated in opposite directions on a common axis passing through the axis of reflection of the two lower reflective elements.

3. In an instrument of the class described, the combination with an ocular, of a pair of co-operatively associated prismatic telescopes, means for mounting the telescopes for rotation in opposite directions through quadrant about a common axis, said axis being in alignment with the optical axis of the ocular.

4. In an instrument of the character described, the combination with an ocular, of a pair of co-operatively associated prismatic telescopes means whereby the telescopes may be rotated in opposite directions through quadrant and about a common axis said axis being in alignment with the optical axis of said ocular, a circular scale member co-operatively associated with said telescopes for registering the degree of rotation imparted to said telescopes, and a common means for the actuation in synchronism of both said telescopes and said scale member.

5. In an instrument of the character described, the combination with an ocular, of a pair of co-operatively associated prismatic telescopes means whereby the telescopes may be rotated in parallel planes in opposite directions about a common axis said axis being in alignment with the optical axis of said ocular, a scale member co-operatively associated with said telescopes and adapted for registering the degree of rotation imparted to said telescopes, a common means for the actuation in synchronism of both said telescopes and said scale member, a means for scale illumination, and an indicating means arranged to indicate scale movement.

6. In a distance determining instrument, the combination with an ocular, of a pair of similar co-operatively associated prismatic telescopes adapted for rotation through quadrant in parallel planes and opposite directions about a common axis in co-axial alignment with that of the optical axis of said ocular, the said telescopes being comprised, respectively, of spaced and oppositely disposed reflective prism elements and an objective, the upper of said prisms constituting the initial ray-receiving elements and the lower the ocular prism elements, the rearmost of said ocular prism elements being rendered centrally light transmissive to permit the passage freely therethrough of the light reflected centrally by the forward of said ocular prism elements, a transparent scale member bearing graduations intermediate said ocular and the rearmost of said ocular prism elements, and a common means for the rotation in synchronism of the said scale member and the said telescopes about the said common axis.

7. In combination, a pair of similar prismatic telescopes positioned in parallel planes and rotatably united for co-operative association near their lower extremities by a tubular connection, the said telescopes comprising each a reflective system constituted of two similar, spaced and oppositely disposed prism elements in cooperatively associated alignment with an objective, the lower element of the rearward reflective system being rendered light transmissive centrally for the passage therethrough of light as reflected centrally by the lower element of the forward reflective system, the said tubular connection being arranged and adapted for the passage therethrough of the light as thus reflected, as well as an axis of rotation for said telescopes, a transparent circular scale member adapted to register rotative movements of said telescopes, a common mechanism adapted for the rotation in synchronism of said telescopes in opposed directions through quadrant and said scale member through a complete revolution, a means for the marginal illumination of said scale member, a scale indicator carried by said means, and means for the magnification and observation of the image field as presented by and through the said telescopes and also that of the scale graduations as illuminated by said scale illuminating means.

8. The combination, in an instrument of the character described, of a base mount bearing yokes, a housing supported in said yokes by trunnions and adapted for rotation in a vertical plane, an ocular borne rearwardly by said housing, a pair of similar prismatic telescopic members co-operatively associated with said ocular through the medium of their lower prism elements, said prism elements being in co-axial alignment with the optical axis of said ocular and said telescopic members adapted for rotation thereabout through quadrant, means borne by said members for their actuation, a mechanism operatively connected with said means, a revoluble circular transparent scale member co-operatively associated with said mechanism and adapted to register the degree of movement of said telescopic members, a means for the actuation of said mechanism, and an illuminating means and an indicating means for said scale.

In testimony whereof I hereunto affix my signature.

GRAVES GRIFFITH.